(12) United States Patent
Takeno et al.

(10) Patent No.: US 12,534,877 B2
(45) Date of Patent: Jan. 27, 2026

(54) WORK MACHINE COLLISION AVOIDANCE CONTROL WITH AUTOMATIC BRAKING AND MACHINE ROLLOVER PREVENTION

(71) Applicant: KOMATSU LTD., Tokyo (JP)

(72) Inventors: Akira Takeno, Tokyo (JP); Toshitaka Kurosawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 233 days.

(21) Appl. No.: 18/549,091

(22) PCT Filed: Jan. 20, 2022

(86) PCT No.: PCT/JP2022/001968
§ 371 (c)(1),
(2) Date: Sep. 5, 2023

(87) PCT Pub. No.: WO2022/201806
PCT Pub. Date: Sep. 29, 2022

(65) Prior Publication Data
US 2024/0151000 A1    May 9, 2024

(30) Foreign Application Priority Data
Mar. 26, 2021  (JP) ................. 2021-053326

(51) Int. Cl.
*E02F 9/20*    (2006.01)
*E02F 3/34*    (2006.01)
(Continued)

(52) U.S. Cl.
CPC ............. *E02F 9/2083* (2013.01); *E02F 9/02* (2013.01); *E02F 9/261* (2013.01); *E02F 3/34* (2013.01); *E02F 9/2292* (2013.01); *E02F 9/2296* (2013.01)

(58) Field of Classification Search
None
See application file for complete search history.

(56) References Cited

U.S. PATENT DOCUMENTS

2013/0066527 A1* 3/2013 Mizuochi .................. E02F 9/24
                                                               701/50
2014/0121840 A1* 5/2014 Mizuochi ................ G06F 30/15
                                                              700/275
(Continued)

FOREIGN PATENT DOCUMENTS

CN        103597147 A     2/2014
CN        111788360 A    10/2020
(Continued)

OTHER PUBLICATIONS

Kamm et al., "A Stability Indicator for Front-End Loaders", 1976, SAE International, SAE Transactions, vol. 85, Section 3, pp. 2027-2033 (Year: 1976).*

(Continued)

*Primary Examiner* — Kenneth M Dunne
(74) *Attorney, Agent, or Firm* — GLOBAL IP COUNSELORS, LLP

(57) ABSTRACT

A work machine includes a vehicle body, an object detecting section, a state detecting section, and a control section. The vehicle body includes a traveling unit and a work implement disposed on the traveling unit. The object detecting section detects an object in a periphery of the vehicle body. The state detecting section detects at least one state of an inclination of the vehicle body, an articulation of the vehicle body and the work implement. The control section sets a deceleration using automatic braking when the object is detected, based on a relationship, with which the vehicle body is stoppable, between a stable range in a lateral direction and a center of gravity position. The relationship is obtained from detection information of the state detecting section.

12 Claims, 14 Drawing Sheets

(51) Int. Cl.
*E02F 9/02* (2006.01)
*E02F 9/22* (2006.01)
*E02F 9/26* (2006.01)

(56) References Cited

U.S. PATENT DOCUMENTS

| | | | |
|---|---|---|---|
| 2017/0135277 A1 | 5/2017 | Hiramatsu et al. | |
| 2017/0284056 A1 | 10/2017 | Mizuochi et al. | |
| 2020/0172087 A1* | 6/2020 | Shur | E02F 9/2025 |
| 2020/0315083 A1* | 10/2020 | Mei | E02F 9/262 |
| 2021/0009116 A1 | 1/2021 | Fujiyoshi et al. | |
| 2021/0206430 A1* | 7/2021 | North | B62D 11/04 |
| 2022/0067403 A1* | 3/2022 | Khonsarian | B60W 30/08 |

FOREIGN PATENT DOCUMENTS

| | | | |
|---|---|---|---|
| DE | 4137382 C1 * | 4/1993 | B62D 9/00 |
| DE | 102016015521 A1 * | 6/2018 | E02F 9/0841 |
| EP | 2733036 A2 * | 5/2014 | B60W 30/04 |
| EP | 3 225 751 A1 | 10/2017 | |
| JP | 3219005 U | 10/2018 | |
| JP | 2019-2242 A | 1/2019 | |
| JP | 2019-49150 A | 3/2019 | |
| JP | 2020-153114 A | 9/2020 | |
| JP | 2020-163919 A | 10/2020 | |
| JP | 2020165230 A * | 10/2020 | |
| WO | 2015/147149 A1 | 10/2015 | |
| WO | 2019/180843 A1 | 9/2019 | |

OTHER PUBLICATIONS

Machine translation of DE-4137382-C1 (Year: 1993).*
Machine translation of JP-2020165230-A (Year: 2020).*
Machine translation of EP-2733036-A2 (Year: 2014).*
Machine translation of DE-102016015521-A1 (Year: 2018).*
The International Search Report for the corresponding international application No. PCT/JP2022/001968, issued on Apr. 19, 2022.
The extended European search report for the corresponding European application No. 22774609.6, issued on Nov. 22, 2024.
First Office Action received for Chinese Application No. 202280016538. 4, issued on Jun. 28, 2025, 11 pages.

* cited by examiner

WORK MACHINE COLLISION AVOIDANCE CONTROL WITH AUTOMATIC BRAKING AND MACHINE ROLLOVER PREVENTION

CROSS-REFERENCE TO RELATED APPLICATIONS

This application is a U.S. National stage application of International Application No. PCT/JP2022/001968, filed on Jan. 20, 2022. This U.S. National stage application claims priority under 35 U.S.C. § 119(a) to Japanese Patent Application No. 2021-053326, filed in Japan on Mar. 26, 2021, the entire contents of which are hereby incorporated herein by reference.

BACKGROUND

Field of the Invention

The present invention relates to a work machine and a control method for the work machine.

Background Information

An automatic stopping system has been proposed that detects an obstacle and stops automatically in a wheel loader that is an example of a work machine (for example, see Registration of Utility Model No. 3219005).

In Registration of Utility Model No. 3219005, an area from the wheel loader to an obstacle is divided into three areas made up of a first area, a second area, and a third area in order of the shortest distance to the object, and an alarm is issued in the first area, the speed is reduced in the second area, and the vehicle is stopped in the third area.

SUMMARY

However, when performing work at a construction site or the like, a work machine is often in a relatively unstable state and it is possible that the work machine will enter a more unstable state when a sudden braking is performed in such a state.

An object of the present disclosure is to provide a work machine and a control method for the work machine so that a collision with an object can be suppressed while in a stable state.

A work machine according to a first disclosure comprises a vehicle body, an object detecting section, a state detecting section, and a control section. The vehicle body includes a traveling unit and a work implement disposed on the traveling unit. The object detecting section detects an object in a periphery of the vehicle body. The state detecting section detects at least one state of an inclination of the vehicle body, an articulation of the vehicle body, and the work implement. The control section sets a deceleration using automatic braking when an object is detected, based on a relationship, with which the vehicle body is stoppable, between a stable range in the lateral direction and a center of gravity position. The relationship is obtained from detection information of the state detecting section.

A control method for a work machine according to a second disclosure comprises an object information acquiring step, a state detection step, and a setting step. The object information acquiring step involves acquiring information of an object in the periphery of a vehicle body that has a traveling unit and a work implement disposed on the traveling unit. The state detecting step involves detecting at least one state of an inclination of the vehicle body, an articulation of the vehicle body, and the work implement. The setting step involves setting a deceleration using automatic braking when an object is detected, based on a relationship, with which the vehicle body is stoppable, between a stable range in the lateral direction and a center of gravity position. The relationship is obtained from detection information in the state detecting step.

According to the present disclosure, there can be provided a work machine and a method for controlling the work machine so that a collision with an object can be suppressed while in a stable state.

DETAILED DESCRIPTION OF EMBODIMENT(S)

The following is an explanation of a wheel loader as an example of a work machine according to the present disclosure with reference to the drawings.

(Outline of Wheel Loader)

Figure 1A:
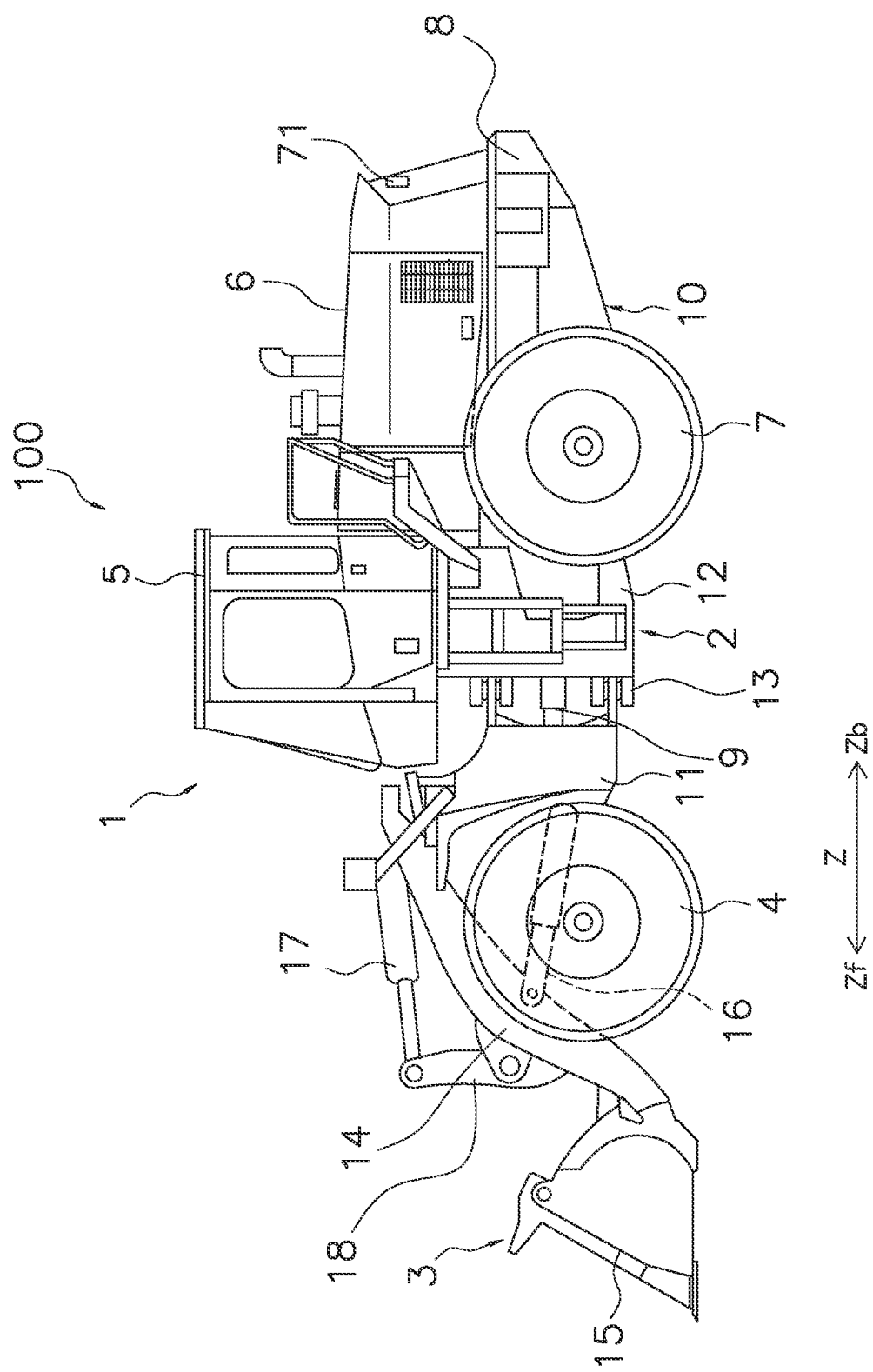
FIG. 1A is side view of a wheel loader according to an embodiment of the present disclosure.
Figure 1B:
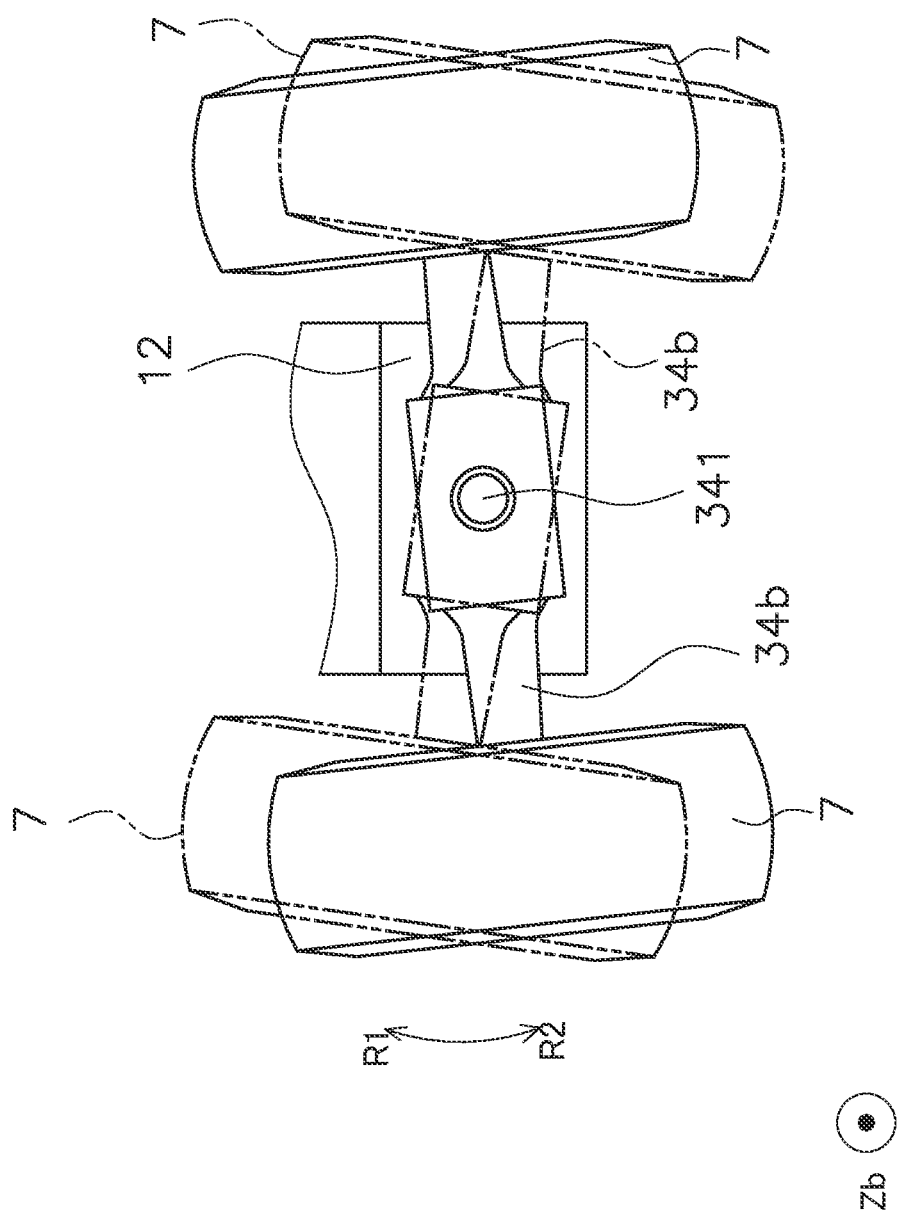
FIG. 1B is configuration view as seen from the rear in the vicinity of the rear tires of the wheel loader according to an embodiment of the present disclosure.

FIG. 1A is a schematic view of a configuration of the wheel loader 100 (example of a work machine) of the present embodiment. The wheel loader 100 of the present embodiment has a vehicle body 1 including a traveling unit 2 and a work implement 3. The work implement 3 is disposed on the traveling unit 2. The traveling unit 2 is provided with a vehicle body frame 10, a pair of front tires 4, a cab 5, an engine room 6, a pair of rear tires 7, a counterweight 8, and a pair of steering cylinders 9. In the following explanations, "front," "rear," "right," "left," "up," and "down" indicate directions relative to a state of looking forward from the driver's seat. "Vehicle width direction," "left-right direction," and "lateral direction" have the same meaning. In FIG. 1A, the front-back direction is represented by Z, and Zf is used to indicate the forward direction and Zb is used to indicate the rearward direction. FIG. 1B is a view as seen from the rear in the vicinity of the rear tires 7 of the wheel loader 100 of the present embodiment.

The wheel loader 100 performs work such as earth and sand loading by using the work implement 3.

The vehicle body frame 10 is a so-called articulated construction and has a front frame 11, a rear frame 12, and a coupling shaft part 13. The front frame 11 is disposed in front of the rear frame 12. The coupling shaft part 13 is provided in the center in the vehicle width direction and couples the front frame 11 and the rear frame 12 to each other in a manner that allows swinging.

A front axle 34a (see below mentioned FIG. 5) that follows in the left-right direction is attached to the lower side of the front frame 11. The pair of front tires 4 are attached to the left and right ends of the front axle 34a.

A rear axle 34b that follows in the left-right direction is attached to the lower side of the rear frame 12 as illustrated in FIG. 1B. The pair of rear tires 7 are attached to the left and right ends of the rear axle 34b. The rear axle 34b is rotatably attached to the rear frame 12 at a middle part 341 in the left-right direction. The rear axle 34b rotates about the middle part 341 in a roll direction that is perpendicular to the front-back direction as illustrated in FIG. 1B. In FIG. 1B, the rear axle 34b and the rear tires 7 in a state (arrow R2) in which the left side rear tire 7 has rotated downward, are indicated by solid lines, and the rear axle 34b and the rear tires 7 in a state (arrow R1) in which the left side rear tire 7 has rotated upward, are indicated by chain double-dashed lines. In this way, effects of unevenness of the ground surface during traveling can be absorbed by providing an oscillating mechanism so that the rear axle 34b rolls and rotates with respect to the rear frame 12.

The pair of steering cylinders 9 are arranged on the left and right sides with the coupling shaft part 13 interposed therebetween. Each of the steering cylinders 9 has one end attached in a rotatable manner to the front frame 11 and another end attached in a rotatable manner to the rear frame 12. The rotation angle of the front frame 11 with respect to the rear frame 12 is changed by extending or contracting the steering cylinders 9.

The work implement 3 is driven by hydraulic fluid from a work implement pump which is not illustrated. The work implement 3 includes a boom 14, a bucket 15, a lift cylinder 16, and a bucket cylinder 17. The boom 14 is mounted onto the front frame 11. The bucket 15 is attached to the tip of the boom 14.

The lift cylinder 16 and the bucket cylinder 17 are hydraulic cylinders. One end of the lift cylinder 16 is attached to the front frame 11 and the other end of the lift cylinder 16 is attached to the boom 14. The boom 14 swings up and down due to the extension and contraction of the lift cylinder 16. One end of the bucket cylinder 17 is attached to the front frame 11 and the other end of the bucket cylinder 17 is attached to the bucket 15 via a bell crank 18. The bucket 15 swings up and down due to the extension and contraction of the bucket cylinder 17.

The cab 5 is disposed on the rear frame 12. A steering handle for performing steering operations, a lever for operating the work implement 3, and various display devices are disposed inside the cab 5. The engine room 6 is arranged to the rear of the cab 5 and on the rear frame 12 and contains an engine 31. The counterweight 8 is disposed at the rear part of the rear frame 12.

Figure 2:
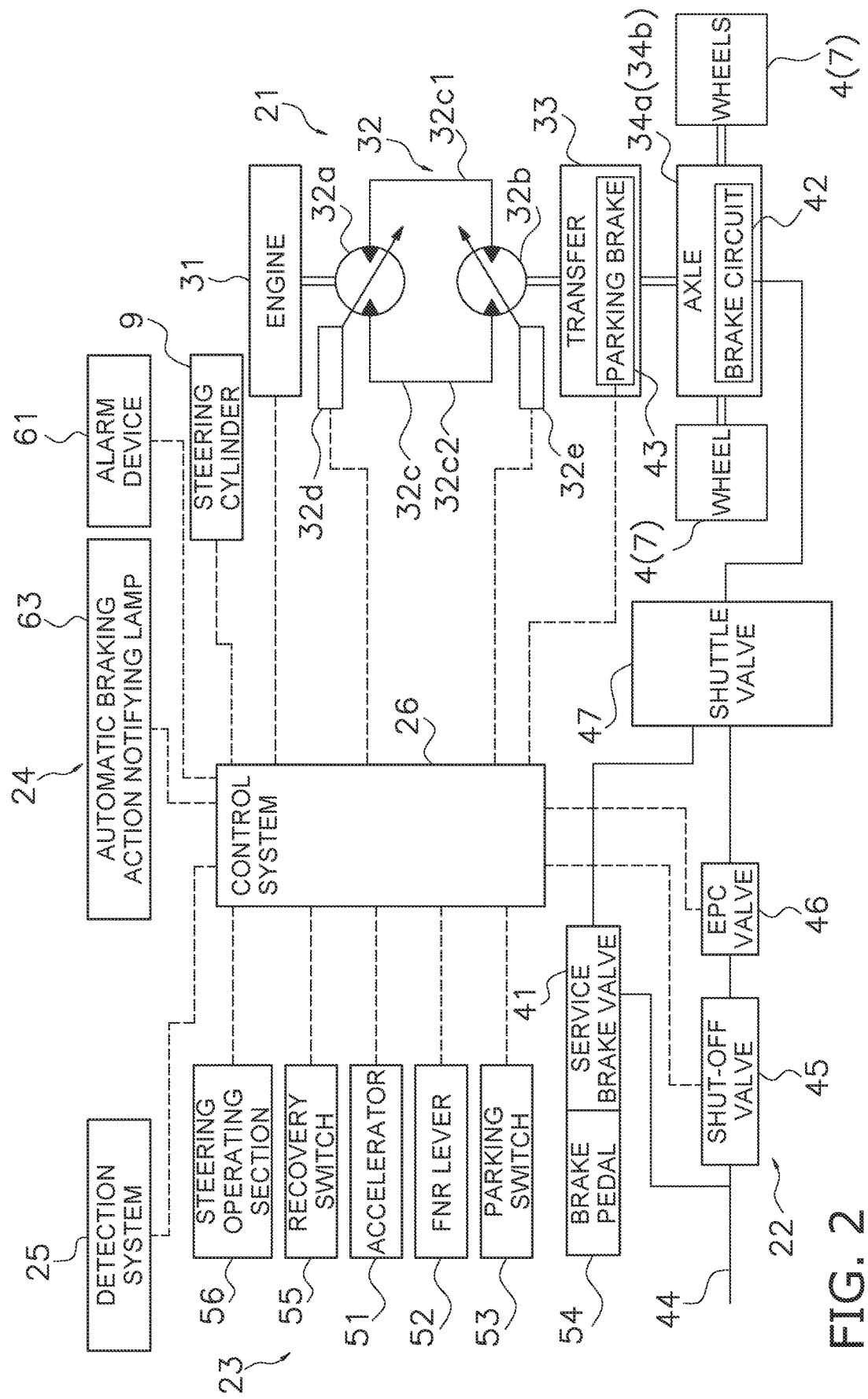
FIG. 2 is block diagram illustrating a configuration of the wheel loader according to an embodiment of the present disclosure.

FIG. 2 is a block diagram illustrating a configuration of the wheel loader 100.

The wheel loader 100 has a driving system 21, a braking system 22, an operating system 23, a warning system 24, a detection system 25, and a control system 26.

The driving system 21 performs driving of the wheel loader 100. The braking system 22 performs braking of the wheel loader 100. The operating system 23 is operated by an operator. The driving system 21 and the braking system 22 are activated on the basis of operations of the operating system 23 by the operator. The warning system 24 issues a warning to the operator on the basis of a detection result by the detection system 25. The detection system 25 detects the state of the vehicle body 1, an object to the rear of the vehicle body 1, and the speed of the vehicle body 1. The control system 26 operates the driving system 21, the braking system 22, and the warning system 24 on the basis of an operation by the operator on the operating system 23 and a detection by the detection system 25.

(Driving System 21)

The driving system 21 has the engine 31, an HST 32, a transfer 33, the axles 34, the front tires 4 and the rear tires 7, and the abovementioned steering cylinders 9.

The engine 31 is, for example, a diesel engine and a driving power generated by the engine 31 drives a pump 32a of the hydro static transmission (HST) 32.

The HST 32 includes the pump 32a, a motor 32b, and a hydraulic circuit 32c that connects the pump 32a and the motor 32b. The pump 32a is a skew plate-type variable capacity pump and the angle of the skew plate can be changed with a solenoid 32d. The pump 32a is driven by the engine 31 to discharge hydraulic fluid. The discharged hydraulic fluid is fed to the motor 32b through the hydraulic circuit 32c. The motor 32b is a skew plate-type pump and the angle of the skew plate can be changed with a solenoid 32e. The hydraulic circuit 32c has a first drive circuit 32c1 and a second drive circuit 32c2. Hydraulic fluid is supplied to the motor 32b from the pump 32a through the first drive circuit 32c1 whereby the motor 32b is driven in one direction (for example, the forward travel direction). Hydraulic fluid is supplied to the motor 32b from the pump 32a through the second drive circuit 32c2 whereby the motor 32b is driven in another direction (for example, the reverse travel direction). The discharge direction of the hydraulic fluid to the first drive circuit 32c1 or to the second drive circuit 32c2 can be changed with the solenoid 32d.

The transfer 33 distributes the output of the engine 31 to the front and rear axles 34.

The pair of front tires 4 are connected to the front side axle 34 and rotate with the output distributed from the engine 31. The pair of rear tires 7 are connected to the rear side axle 34 and rotate with the output distributed from the engine 31.

(Braking System 22)

The braking system 22 has a service brake valve 41, brake circuits 42, a parking brake 43, a brake source pressure supply path 44, a shut-off valve 45, an electric proportional valve (EPC) 46, and a shuttle valve 47.

The service brake valve 41 is operated by a below mentioned brake pedal 54. The brake source pressure supply path 44 is connected to the service brake valve 41. The service brake valve 41 supplies hydraulic fluid supplied from the brake source pressure supply path 44 to the shuttle valve 47 in an open state. The service brake valve 41 stops the supply of hydraulic fluid from the brake source pressure supply path 44 to the shuttle valve 47 in a closed state.

The opening degree of the service brake valve 41 is regulated in accordance with the operating amount of the brake pedal 54 and the amount of hydraulic fluid supplied to the shuttle valve 47 is changed. For example, when the operating amount of the brake pedal 54 is large, the amount of hydraulic fluid supplied to the shuttle valve 47 from the service brake valve 41 is increased.

The brake circuits 42 are provided to the front and rear axles 34. The brake circuits 42 are hydraulic brakes and increase the braking force as the pressure of hydraulic fluid supplied from the shuttle valve 47 increases. The service brake valve 41 and the brake pedal 54 constitute portions of the service brakes.

The parking brake 43 is provided to the transfer 33. For example, a multistage wet brake or a disc brake or the like that can be switched between a braking state and a non-braking state may be used as the parking brake 43.

The shut-off valve 45 is connected to the brake source pressure supply path 44. The shut-off valve 45 opens and closes on the basis of a command from the control system 26. The shut-off valve 45 supplies hydraulic fluid from the brake source pressure supply path 44 to the EPC valve 46 in an open state. The shut-off valve 45 stops the supply of hydraulic fluid from the brake source pressure supply path 44 to the EPC valve 46 in a closed state.

In the present embodiment, the control system 26 sets the shut-off valve 45 to the open state only when, for example, the vehicle body 1 is moving in the rearward direction. Movement of the vehicle body 1 in the rearward direction is determined by the control system 26 on the basis of the rotation of the wheels or an operation of the FNR lever 52.

The EPC valve 46 is disposed in the flow path that connects the shut-off valve 45 and the shuttle valve 47. The EPC valve 46 opens and closes on the basis of a command from the control system 26. The EPC valve 46 supplies the hydraulic fluid supplied from the shut-off valve 45 to the shuttle valve 47 in an open state. The EPC valve 46 stops the supply of hydraulic fluid from the shut-off valve 45 to the shuttle valve 47 in a closed state.

The opening degree of the EPC valve 46 is regulated on the basis of a command from the control system 26 and the amount of hydraulic fluid supplied to the shuttle valve 47 is changed.

The shuttle valve 47 supplies, to the brake circuit 42, hydraulic fluid having greater pressure among the hydraulic fluid supplied via the service brake valve 41 and the hydraulic fluid supplied via the EPC valve 46

While discussed in detail below, even when the brake pedal 54 is not operated and hydraulic fluid is not supplied from the service brake valve 41 when the shut-off valve 45 and the EPC valve 46 are in the open state due to a command from the control system 26, hydraulic fluid is supplied from the shuttle valve 47 to the brake circuit 42 and the braking is activated automatically.

(Operating System 23)

The operating system 23 includes an accelerator 51, the FNR lever 52, a parking switch 53, the brake pedal 54, a recovery switch 55, and a steering operating section 56.

The accelerator 51 is provided inside the cab 5. The operator operates the accelerator 51 to set a throttle opening degree. The accelerator 51 generates an opening degree signal indicating an accelerator operating amount and transmits the opening degree signal to the control system 26. The control system 26 controls the rotation speed of the engine 31 on the basis of the transmitted signal.

When the accelerator 51 is turned to an off state, the supply of fuel to the engine 31 is stopped.

The FNR lever 52 is provided inside the cab 5. The FNR lever 52 is able to assume the positions of forward travel, neutral, and reverse travel. An operation signal indicating the position of the FNR lever 52 is transmitted to the control system 26, and the control system 26 controls the solenoid 32*d* to switch to the forward travel or the reverse travel. In addition, when the FNR lever 52 is in the neutral position, the control system 26 controls the solenoids 32*d* and 32*e* and controls the skew plates of the pump 32*a* and the motor 32*b* so that travel resistance is obtained.

The parking switch 53 is provided inside the cab 5, is a switch that can be switched to an on or an off state, and transmits a signal indicating the state to the control system 26. The control system 26 sets the parking brake 43 in a braking state or a non-braking state on the basis of the transmitted signal.

The brake pedal 54 is provided inside the cab 5. The brake pedal 54 regulates the opening degree of the service brake valve 41.

The recovery switch 55 is operated by the operator for recovering from a stopped state after the vehicle body 1 has stopped due to the below mentioned automatic braking (example of avoidance control). The braking force produced by the control of the accelerator 51 being turned off and by the control due to the FNR lever 52 being in the neutral position, may be included in the automatic braking.

The steering operating section 56 includes a steering wheel and a joy stick lever, etc., and changes the bending angle (articulation angle) of the front frame 11 with respect to the rear frame 12. When the steering operating section 56 is operated, the steering operation angle is transmitted to the control system 26. The control system 26 sets the steering operation angle to the speed or target angle of the steering cylinder 9 and transmits the speed or target angle as a bending operation command to the steering cylinder 9.

(Warning System 24)

The warning system 24 has an alarm device 61 (example of a warning section) and an automatic braking action notifying lamp 63.

The alarm device 61 issues an alarm to the operator due to a command from the control system 26 when an obstacle has been detected to the rear of the vehicle body 1 during reverse travel on the basis of a detection by a rearward detecting section 71 of the belowmentioned detection system 25. The warning by the alarm device 61 corresponds to an example of an avoidance control.

The alarm device 61 may, for example, have a lamp and may cause the lamp to be lit. Moreover, the alarm device 61 is not limited to having a lamp and may have a speaker and may emit a sound. Moreover, the alarm may also be displayed on a display panel such as a monitor.

The automatic braking action notifying lamp 63 notifies the operator that the automatic braking is operating and notifies the operator that there is a need to perform a recovery action by means of the recovery switch 55. The automatic braking action notifying lamp 63 turns off when the recovery switch 55 is operated and the automatic braking is released.

The automatic braking action notifying lamp 63 is not limited to a lamp and may also emit a sound. Moreover, the notification may also be displayed on a display panel such as a monitor.

The means for warning the operator of information with the abovementioned warning system 24 may be selected from a lamp, a sound, or a monitor as appropriate.

(Detection System 25)

Figure 3:
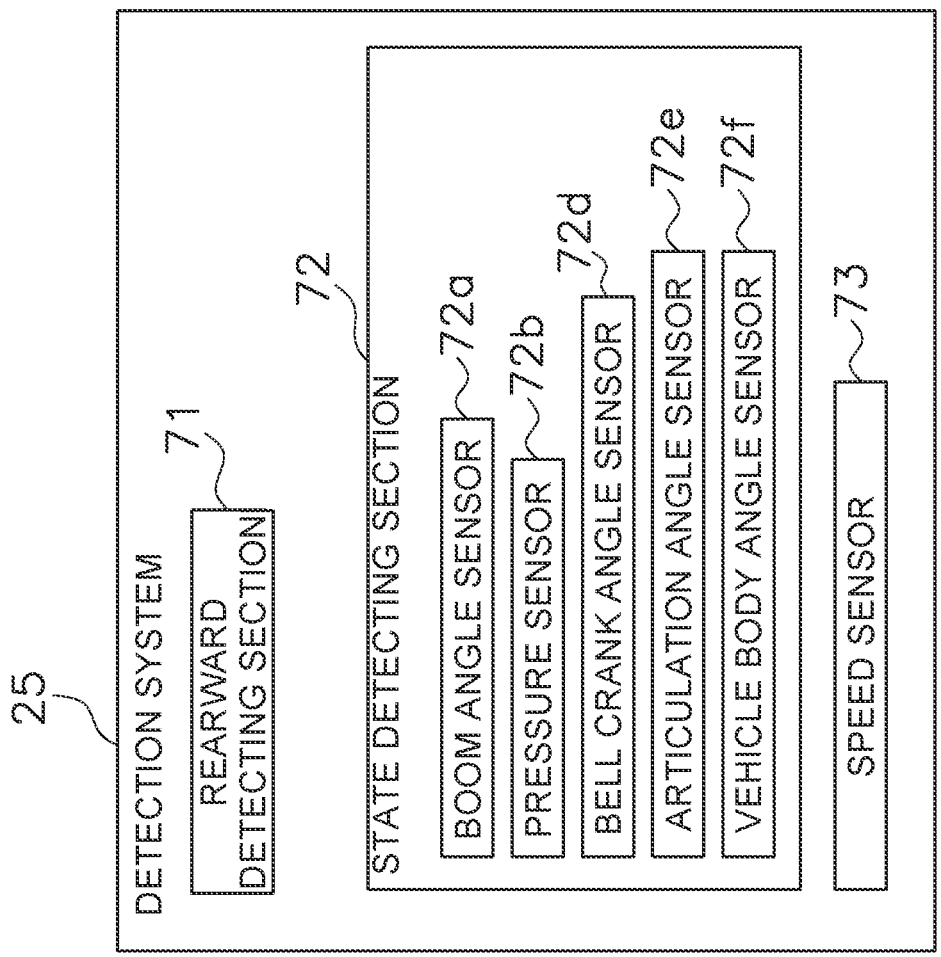
FIG. 3 is block diagram illustrating a configuration of a detection system of the wheel loader according to an embodiment of the present disclosure.

FIG. 3 is a block diagram of a configuration of the detection system 25.

The detection system 25 has the rearward detecting section 71 (example of an object detecting section), a state detecting section 72, and a speed sensor 73 (example of a speed detecting section).

The rearward detecting section 71 detects an object to the rear of the vehicle body 1. While the rearward detecting section 71 is attached, for example, to the rear end of the vehicle body 1 as illustrated in FIG. 1A, the attachment may not be limited to the rear end.

The rearward detecting section 71 has, for example, a millimeter wave radar. The state of a radio wave in a millimeter-wave band emitted from a transmission antenna, reflecting off the surface of the obstacle and returning, is detected by a reception antenna, and the distance to the object can be measured. The detection result of the state detecting section 72 is transmitted to the control system 26 and the control system 26 is able to determine the presence of the object within a prescribed range during reverse travel. The rearward detecting section 71 is not limited to having a millimeter-wave radar and may also have, for example, a camera. The automatic braking is implemented when the presence of an object is detected rearward by the rearward detecting section 71 during reverse travel.

The state detecting section 72 detects a state of the vehicle body 1. On the basis of the detection by the state detecting section 72, the control system 26 considers the stability of travel when the automatic braking is implemented using a setting braking force that is set beforehand, and executes the automatic braking with a rollover suppression braking force with which stability is improved. The deceleration when braking with the setting braking force is referred to as a setting deceleration, and the deceleration when braking with the rollover suppression braking force is referred to as a rollover suppression deceleration. The rollover suppression deceleration is set to be less than the setting deceleration.

The states of the vehicle body 1 used when determining stability may include, for example, (1) the inclination angle of the wheel loader 100, (2) the attitude of the work implement 3, (3) the state of the load, and (4) the articulation angle.

(1) Explaining the Inclination Angle of the Wheel Loader

Figure 4:
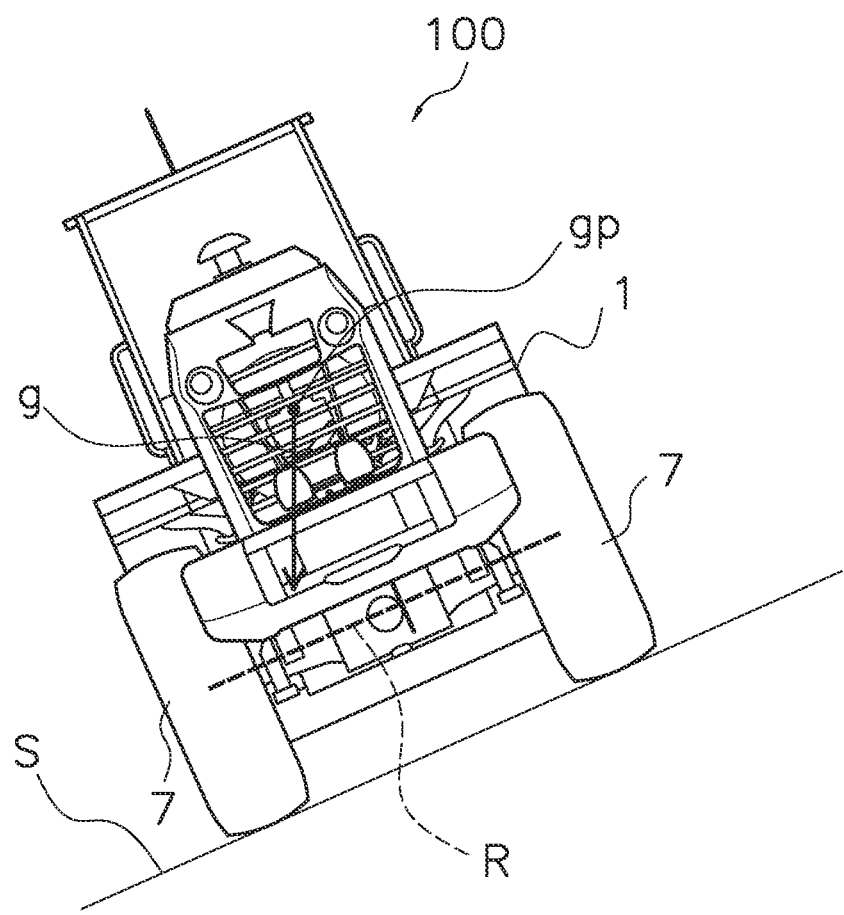
FIG. 4 is view illustrating a state in which the wheel loader is disposed on an inclined road surface according to an embodiment of the present disclosure.
Figure 5:
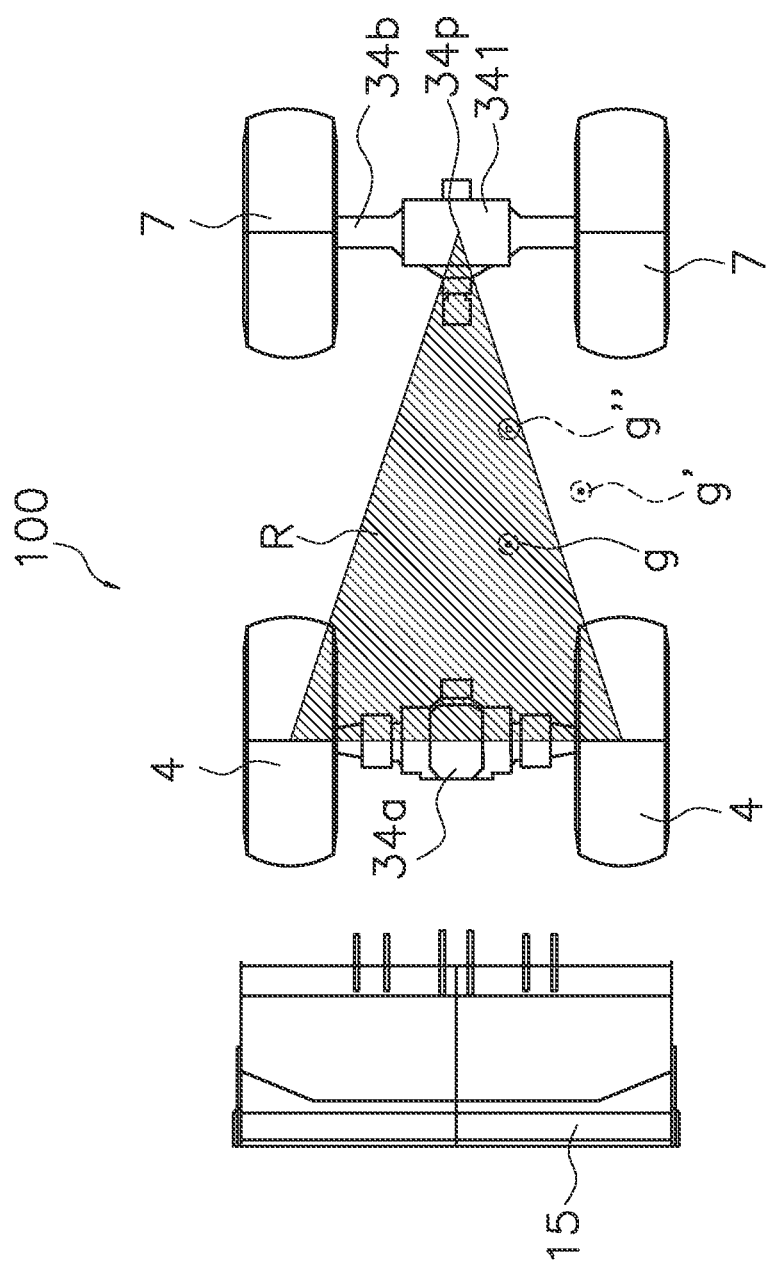
FIG. 5 is rear surface view illustrating a stable range of the wheel loader according to an embodiment of the present disclosure.

FIG. 4 illustrates a state in which the wheel loader 100 is disposed on an inclined road surface S. The wheel loader 100 in FIG. 4 is inclined in the left-right direction (width direction). FIG. 5 schematically illustrates the rear surface of the wheel loader 100. FIG. 5 is a view of the rear of the wheel loader 100 from a direction perpendicular to the inclined surface.

The state detecting section 72 has a vehicle body angle sensor 72*f*. The vehicle body angle sensor 72*f* is disposed on the vehicle body frame 10. A vehicle body controller 90 of the control system 26 is able to determine that the wheel loader 100 is disposed on the inclined road surface S on the basis of a detection value detected by the vehicle body angle sensor 72*f*. An inertial measurement unit (IMU) may be used in place of the vehicle body angle sensor 72*f*.

The state detecting section 72 also detects detection values that are explained in the below mentioned (2) attitude of the work implement 3, (3) the state of the load, and the articulation angle, and a center of gravity position gp of the vehicle body 1 is identified by the control system 26 on the basis of the detection values.

In FIG. 4, the center of gravity of the wheel loader 100 is indicated with gp and the gravity vector thereof is indicated by arrow g. A stable range R is depicted in FIGS. 4 and 5.

In FIG. 5, the stable range R is set, for example, in an approximately triangular shape enclosed by a first straight line along the center of the front axle 34*a*, a second straight line that joins the left end of the front axle 34*a* and a rotation center 34*p* of the rear axle 34*b*, and a third straight line that joins the right end of the front axle 34*a* and the rotation center 34*p* of the rear axle 34*b*. The position of the gravity vector g depicted in FIG. 5 is the position where the stable range R crosses the gravity vector g from the center of gravity position gp. Even when the vehicle body frame 10 is bent, the stable range R can be set in the same way.

The stability is determined on the basis of the position of the gravity vector g from the center of gravity position gp with respect to the stable range R. The stability based on the automatic braking decreases as the inclination in the transverse direction increases. For example, because the stability gradually decreases as the position where the gravity vector g and the stable range R cross approaches the end of the stable range R, the rollover suppression deceleration is set to be smaller. When the position where the gravity vector g and the stable range R cross deviates from the stable range R (indicated by g' in FIG. 5), the automatic braking is not implemented and only the alarm from the alarm device 61 is issued.

While an example in which the wheel loader 100 is inclined in the left-right direction is depicted in FIG. 4, inclination in the front-back direction may also be determined. However, the stability based on the automatic braking is reduced more in the inclination in the left-right direction.

As illustrated in FIG. 5, the width in the left-right direction of the stable range R widens further toward the front. As a result, while the vehicle body frame 10 is disposed on a slope such that, for example, the front frame 11 side is higher than the rear frame 12, the position where the gravity vector g and the stable range R cross moves to the rear (see gravity vector g″) and the stable range becomes narrower in the lateral direction. In this way, inclination in the front-back direction affects the stability in the lateral direction.

(2) Attitude of Work Implement

Figure 6:
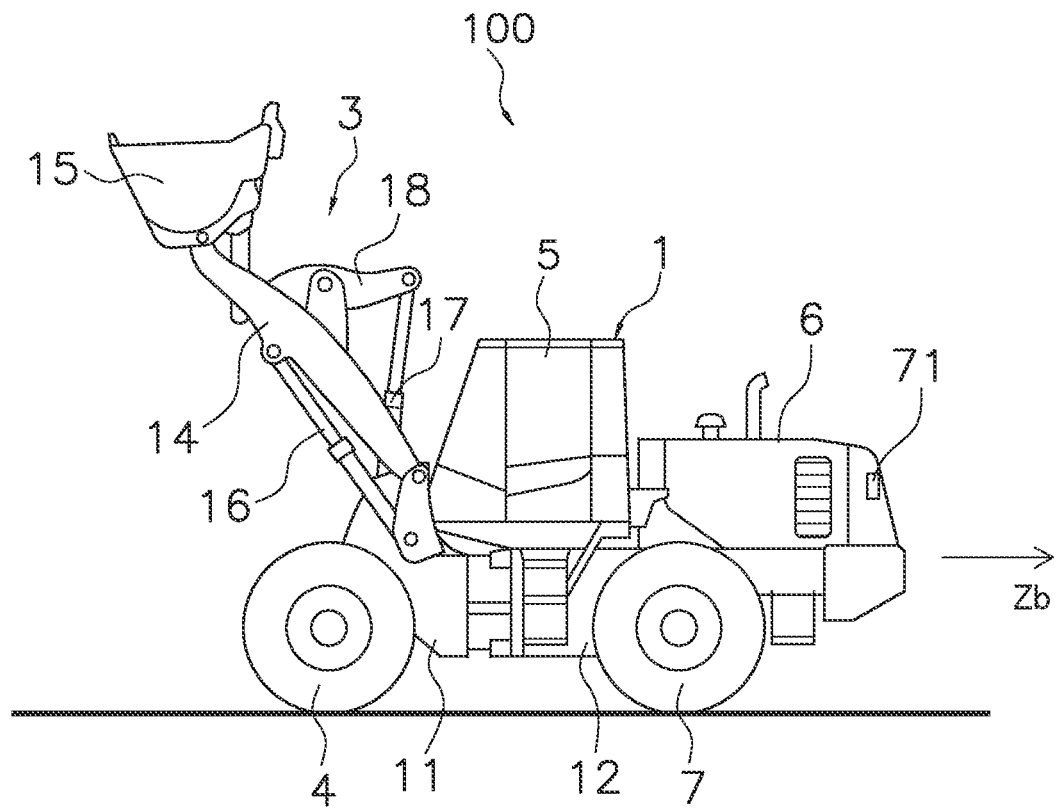
FIG. 6 is view illustrating a state in which the boom of the wheel loader has been rotated upward according to an embodiment of the present disclosure.

FIG. 6 illustrates a state in which the boom 14 of the wheel loader 100 is rotated upward.

The state detecting section 72 has, for example, a boom angle sensor 72*a* (see FIG. 3) for detecting the attitude of the work implement 3. The control system 26 calculates the rollover suppression deceleration that considers the stability on the basis of the angle of the boom 14 detected by the boom angle sensor 72*a*. Determining the attitude of the work implement 3 is not limited to the boom angle sensor 72*a* and may be determined by providing a camera and performing image analysis.

The stability based on the automatic braking decreases as the angle of the boom 14 increases. For example, because the stability decreases as the upward rotation angle of the boom 14 increases, the rollover suppression deceleration can be set to become smaller. The reduction of the rollover suppression deceleration may be performed in a linear function manner accompanying the increases in the angle of the boom 14 or may be performed in an exponential function manner.

(3) State of Load

Figure 7:
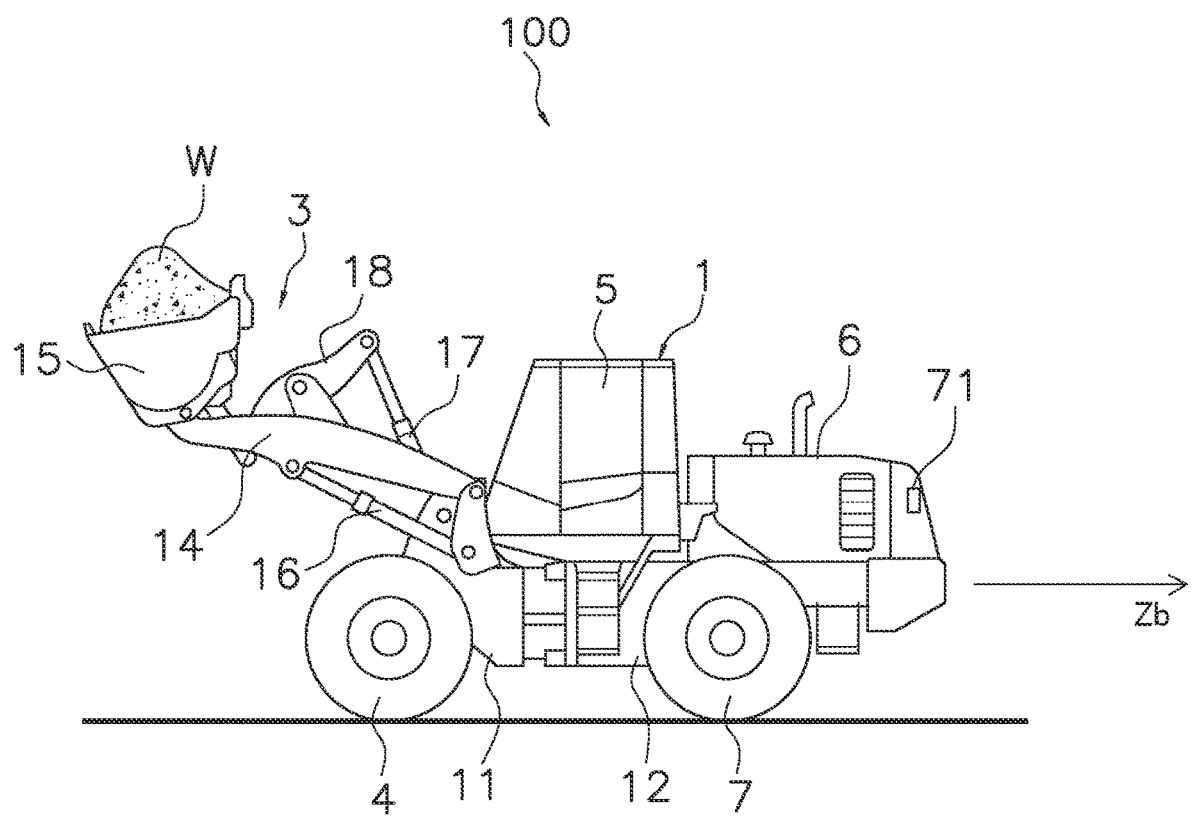
FIG. 7 is view illustrating a state in which the excavation bucket of the wheel loader is loaded according to an embodiment of the present disclosure.

FIG. 7 illustrates the wheel loader 100 while a load W is piled on the bucket 15.

As illustrated in FIG. 3, the state detecting section 72 has, in order to detect the state of the load, a pressure sensor 72b that detects the pressure of the lift cylinder 16, the boom angle sensor 72a, and a bell crank angle sensor 72d for detecting whether the bucket 15 is in a tilted state. Whether the bucket 15 is in the tilted state is determined by the length of the bucket cylinder 17. The length of the bucket cylinder 17 is calculated on the basis of a previously stored table from the boom angle detected by the boom angle sensor 72a and the bell crank angle detected by the bell crank angle sensor 72d, and whether the bucket 15 is in the tilted state can be detected.

The control system 26 calculates the rollover suppression deceleration that considers the stability on the basis of the values of the pressure sensor 72b, the boom angle sensor 72a, and the bell crank angle sensor 72d.

The stability based on the automatic braking is reduced more when the boom is rotated upward with a large load W and the bucket 15 is in the tilted state. For example, because the stability decreases as the values of pressure sensor 72b, the boom angle sensor 72a, and the length of the bucket cylinder 17 increase, the rollover suppression deceleration can be set so as to be smaller. The rollover suppression deceleration may be calculated by weighting the values of pressure sensor 72b, the boom angle sensor 72a, and the length of the bucket cylinder 17.

In addition, a sensor (proximity sensor, etc.) that is able to detect the position of the work implement 3 such as the bucket 15 may be used without using the bell crank angle sensor 72d in order to detect the titled angle and any sensor can be set. Moreover, a camera may be provided and image analysis may be performed for detecting the state of the load.

(4) Articulation Angle

Figure 8:
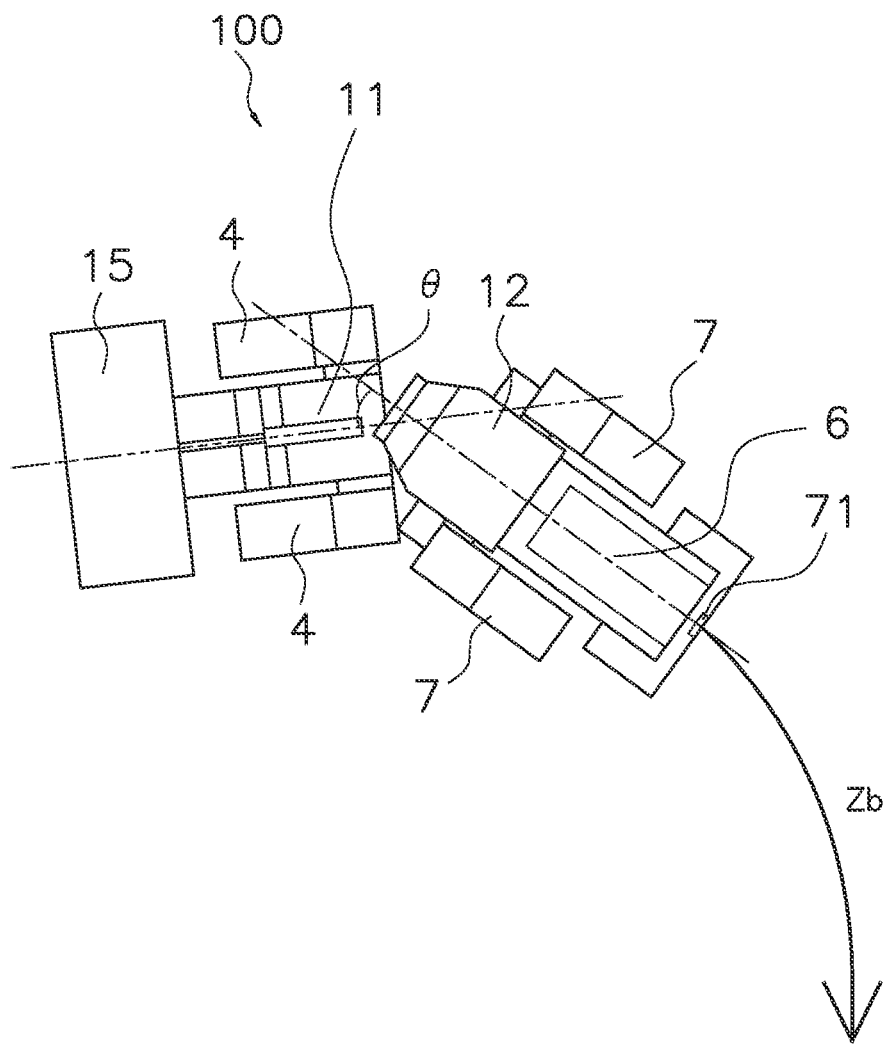
FIG. 8 is a view illustrating an articulated state of the wheel loader according to a present disclosure.

FIG. 8 illustrates a state of the wheel loader 100 in an articulated state.

As illustrated in FIG. 3, the state detecting section 72 has an articulation angle sensor 72e for detecting an articulation angle θ. The articulation angle sensor 72e detects the inclination angle of the front frame 11 with respect to the rear frame 12.

The control system 26 calculates the rollover suppression deceleration that considers the stability on the basis of the articulation angle θ detected by the articulation angle sensor 72e.

The stability based on the automatic braking decreases as the articulation angle θ increases. For example, because the stability decreases as the articulation angle θ increases, the rollover suppression deceleration can be set to become smaller. The reduction of the rollover suppression deceleration may be performed in a linear function manner accompanying the increase in the articulation angle or may be performed in an exponential function manner.

The speed sensor 73 detects the speed of the vehicle body 1 and transmits the speed to the control system 26.

(Control System 26)

Figure 9:
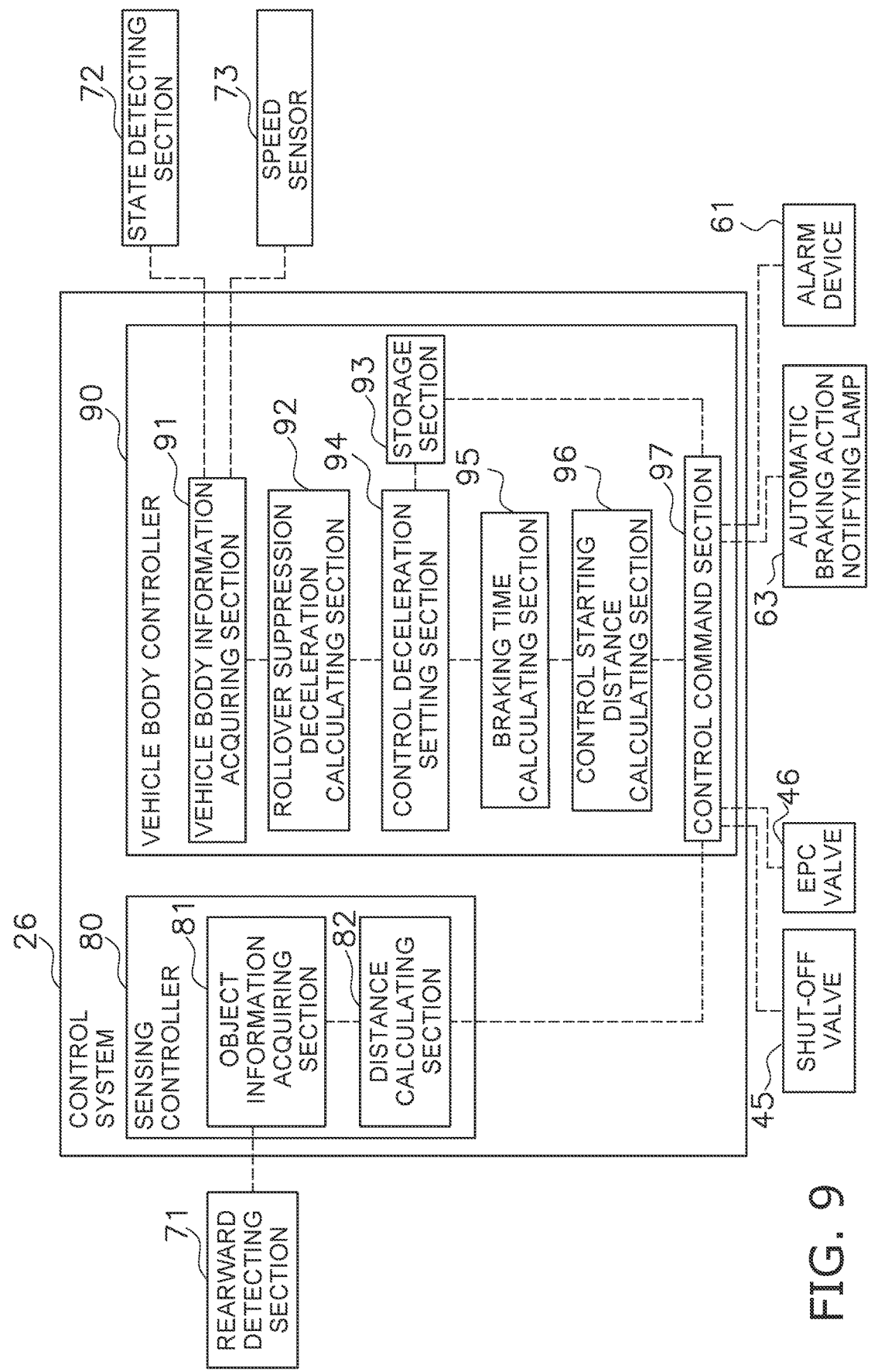
FIG. 9 is block diagram illustrating a configuration of a control system of the wheel loader according to an embodiment of the present disclosure.

FIG. 9 is a block diagram illustrating a configuration of the control system 26 (example of a control section) of the wheel loader 100 of the present embodiment.

The control system 26 has a sensing controller 80 and a vehicle body controller 90.

Each of the sensing controller 80 and the vehicle body controller 90 includes a processor such as a central processing unit (CPU), a main memory that includes a non-volatile memory such as a read-only memory (ROM) and a volatile memory such as a random access memory (RAM), and a storage. The sensing controller 80 and the vehicle body controller 90 each reads programs stored in the storage and expands the programs in the main memory, and executes a predetermined process according to the programs. While the sensing controller 80 and the vehicle body controller 90 are each described as including a CPU in the present embodiment, the sensing controller 80 and the vehicle body controller 90 may also share one CPU. In addition, the programs may be distributed to the sensing controller 80 and the vehicle body controller 90 over a network.

The sensing controller 80 acquires information of the object detected by the rearward detecting section 71. The vehicle body controller 90 executes the automatic braking control.

The sensing controller 80 has an object information acquiring section 81 and a distance calculating section 82.

The object information acquiring section 81 acquires information of the object (target) that is detected by the rearward detecting section 71 and serves as the purpose of stopping. The distance calculating section 82 calculates a distance x (example of a relative distance) from the wheel loader 100 to the object on the basis of the information of the object. The distance calculating section 82 is able to calculate a distance x to the object on the basis of a state in which a millimeter-wave band emitted from the transmission antenna of the rearward detecting section 71 reflects off the surface of the obstacle and returns. An obstacle such as a rock or a building could be given as examples of the object.

The vehicle body controller 90 comprises a vehicle body information acquiring section 91, a rollover suppression deceleration calculating section 92, a storage section 93, a control deceleration setting section 94, a braking time calculating section 95, a control starting distance calculating section 96, and a control command section 97.

The vehicle body information acquiring section 91 acquires vehicle body information detected by the state detecting section 72 and a vehicle body speed $v_0$ detected by the speed sensor 73.

The rollover suppression deceleration calculating section 92 derives the stability from the acquired vehicle body information and the vehicle body speed $v_0$ and further calculates the deceleration (rollover suppression deceleration) for suppressing rollover of the wheel loader 100 during automatic braking by also considering a safety factor. The rollover suppression deceleration is a deceleration based on the abovementioned rollover suppression braking force. For example, the rollover suppression deceleration calculating section 92 identifies the center of gravity position gp and the stable range R of the vehicle body 1 from the acquired vehicle body information, derives the intersection of the stable range R and the gravity vector from the center of gravity position gp, and derives the stability on the basis of the position of the intersection. The rollover suppression deceleration is calculated by applying a safety factor to the derived stability.

The storage section 93 is a memory provided in the vehicle body controller 90 and stores the previously set setting deceleration. The setting deceleration is a value previously set from the hardware capability, etc., of the brake circuit 42, and is a deceleration based on the abovementioned setting braking force.

The control deceleration setting section 94 selects the smaller of the rollover suppression deceleration and the setting deceleration and sets the selected deceleration as the deceleration (control deceleration) when executing the automatic braking control. As a result, if there is a possibility that the wheel loader 100 could roll over when the automatic braking is executed with the previously set setting deceleration, the automatic braking can be executed with the rollover suppression deceleration.

The braking time calculating section 95 calculates the time until the wheel loader 100 stops from the vehicle body speed and the control deceleration (example of a deceleration). Specifically, the following equation (1) is established when the vehicle body speed is $v_0$, the control deceleration is a, and the braking time until the wheel loader 100 stops is t'.

$$v_0 - at' = 0 \quad \text{(Equation 1)}$$

As a result, the braking time t' can be derived by calculating t''=$v_0$/a.

The control starting distance calculating section 96 calculates the distance from the object for starting the automatic braking control. When the distance that the wheel loader 100 proceeds until stopping is x', the following equation (2) is established.

$$x' = v_0 t' - (\tfrac{1}{2}) a t'^2 \quad \text{(Equation 2)}$$

The following equation (3) can be found when $v_0$/a of the abovementioned equation (1) is substituted for t' in equation (2).

$$x' = (\tfrac{1}{2}) v_0^2 / a \quad \text{(Equation 3)}$$

When the target stopping distance up to the object when the automatic braking is applied is xt and the position (distance from object) for starting to apply the automatic braking is xb, the following equation (4) is established.

$$xb = xt + x' \quad \text{(Equation 4)}$$

When $(\tfrac{1}{2}) v_0^2/a$ of equation (3) is substituted for x' in equation (4), the following equation (5) is found.

$$xb = xt + (\tfrac{1}{2}) v_0^2 / a \quad \text{(Equation 5)}$$

Based on equation (5), the automatic braking control starting distance xb (example of a starting distance) that is the position for starting to apply the automatic braking can be derived.

In addition, the control starting distance calculating section 96 derives a distance c (alarm control starting distance from object) for starting the alarm. The alarm control starting distance xc (example of a starting distance) can be set on the basis of the automatic braking control starting distance xb. The distance xc can be set to be greater than the automatic braking control starting distance xb. As a result, the alarm control starting distance xc is set to a distance further away from the object than the automatic braking control starting distance xb and the alarm can be used as a preliminary alarm before the start of the automatic braking.

Figure 10:
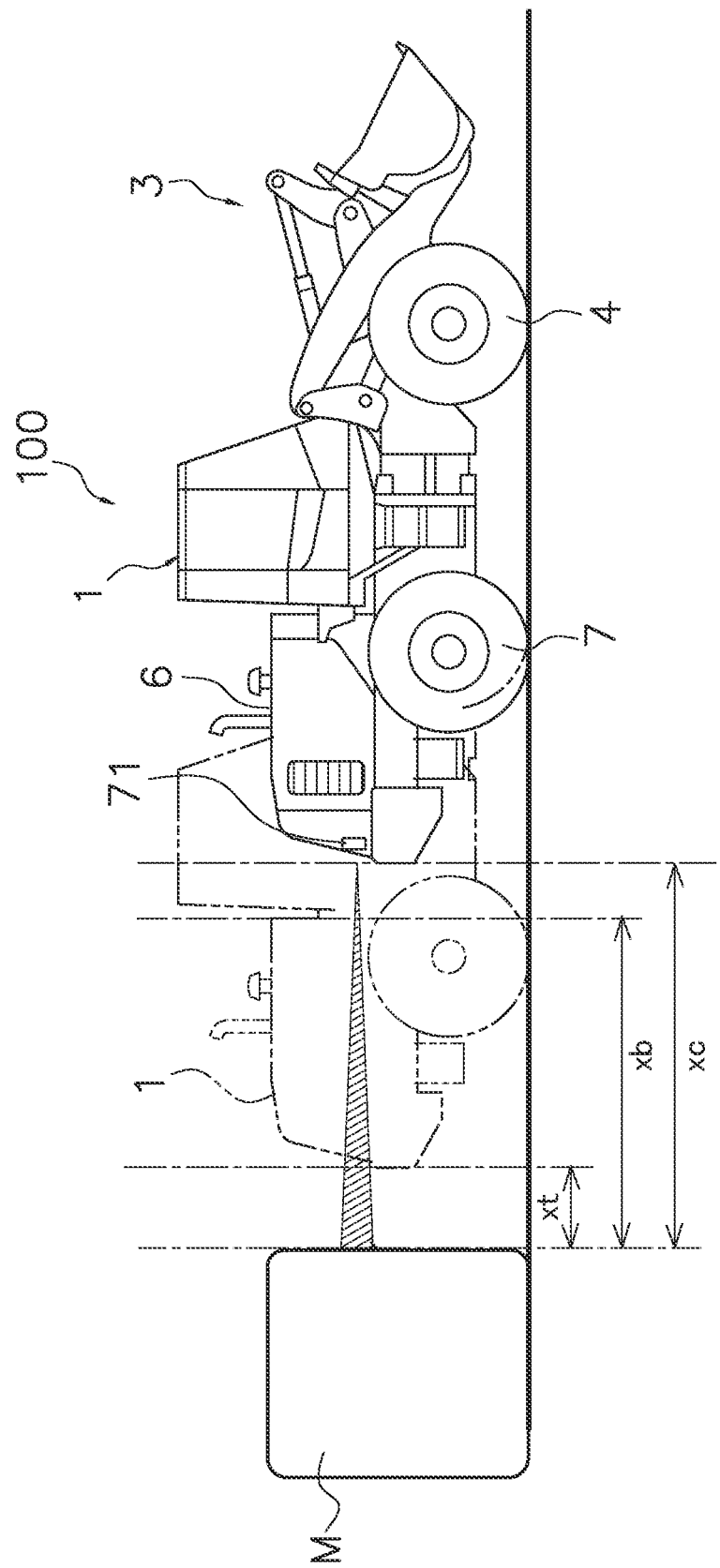
FIG. 10 is side view illustrating a stopped state due to automatic braking of the wheel loader according to an embodiment of the present disclosure.

FIG. 10 illustrates distances of the wheel loader 100 from the object M.

The control command section 97 issues an emission command to the alarm device 61 when the distance x calculated by the distance calculating section 82 reaches the alarm control starting distance xc calculated by the control starting distance calculating section 96. As a result, the alarm device 61 issues the alarm.

The control command section 97 issues an open command to the shut-off valve 45 and the EPC valve 46 so as to establish an opening degree to achieve the control deceleration a when the distance x reaches the automatic braking control starting distance xb. As a result, even if the brake pedal 54 is not being operated, hydraulic fluid is supplied via the shuttle valve 47 to the brake circuit 42 and braking at the control deceleration a is performed. As illustrated in FIG. 10, the wheel loader 100 stops at the distance xt from the object M. The wheel loader 100 in the stopped state is depicted with chain double-dashed lines.

The control command section 97 issues a lighting command to the automatic braking action notifying lamp 63 when the automatic braking control starts.

When the operator operates the recovery switch 55 and the automatic braking is released, the control command section 97 issues an extinction command to the automatic braking action notifying lamp 63.

When the operator operates the brake pedal 54 and the pressure of the hydraulic fluid supplied from the service brake valve 41 becomes larger than the pressure of the hydraulic fluid supplied from the EPC valve 46, the brake circuit 42 is activated by the hydraulic fluid supplied from the service brake valve 41.

(Actions)

Next, the control actions of the wheel loader 100 of the present embodiment will be explained.

Figure 11:
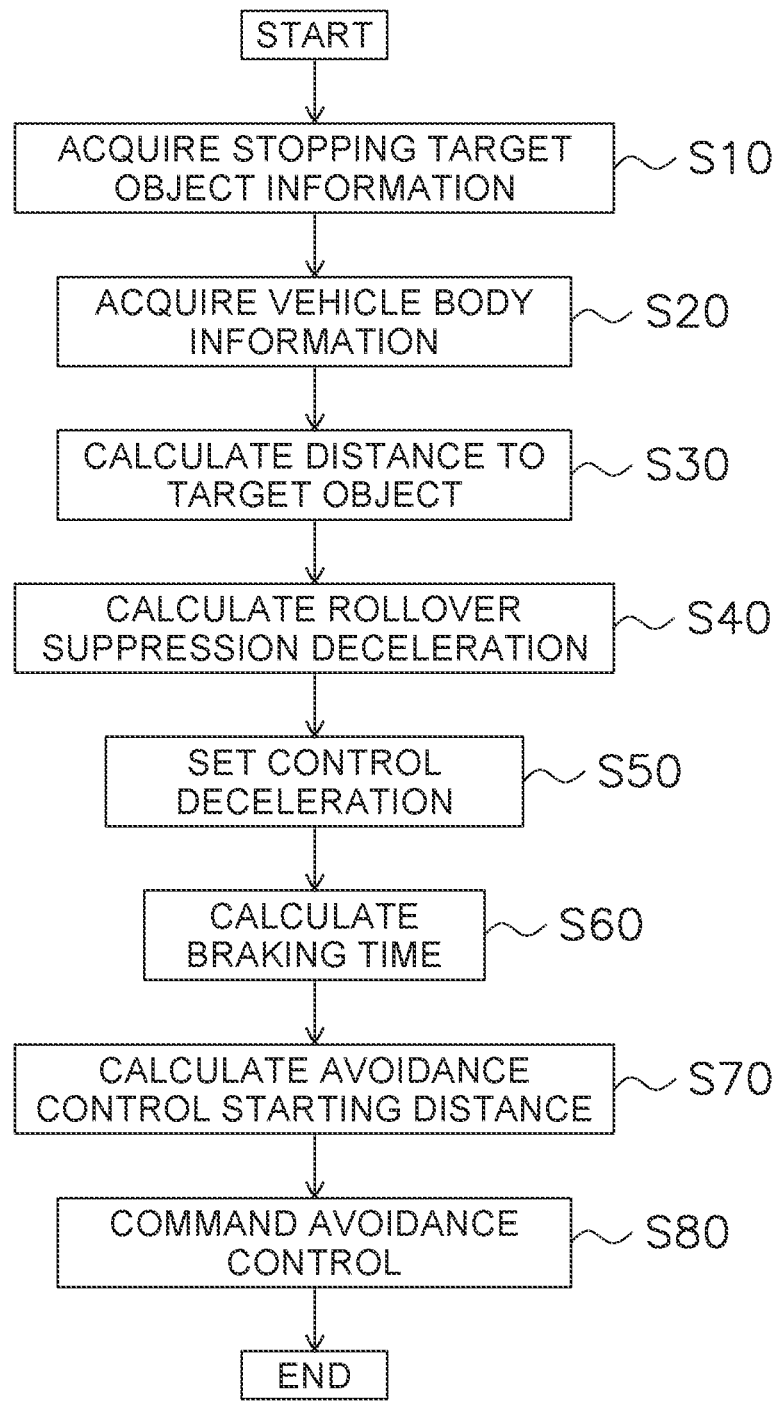
FIG. 11 is a flow chart of the control actions of the wheel loader according to an embodiment of the present disclosure.

FIG. 11 is a flow chart of the control actions of the wheel loader 100 of the present embodiment.

Firstly in step S10, the object information acquiring section 81 acquires the information of the object M from the rearward detecting section 71. When the object information acquiring section 81 receives the information of the object within a prescribed range from the rearward detecting section 71 while it has been detected that reverse travel is being performed, the object information acquiring section 81 transmits the received information of the object to the distance calculating section 82. The object information acquiring section 81 detects, for example, the reverse travel state of the vehicle body 1 due to the fact that the front tires 4 or the rear tires 7 are rotating toward the rear or due to the fact that the FNR lever 52 is in the reverse travel position.

Next in step S20, the vehicle body information acquiring section 91 acquires the vehicle body information detected by the state detecting section 72 and the vehicle body speed $v_0$ detected by the speed sensor 73. The vehicle body information includes (1) the inclination angle of the wheel loader 100, (2) the attitude of the work implement 3, (3) the state of the load, and (4) the articulation angle as indicated above.

Next in step S30, the distance calculating section 82 calculates the distance x from the wheel loader 100 to the object M on the basis of the information of the object.

Next in step S40, the rollover suppression deceleration calculating section 92 calculates, from the acquired vehicle body information, the deceleration (rollover suppression deceleration) for suppressing rollover of the wheel loader 100 while also considering the safety factor.

Next in step S50, the control deceleration setting section 94 selects the smaller of the rollover suppression deceleration and the setting deceleration stored in the storage section 93 and sets the selected deceleration as the deceleration (control deceleration a) when executing the automatic braking control.

Next in step S60, the braking time calculating section 95 uses the equation (1) to calculate the time t' until the wheel loader 100 stops from the vehicle body speed $v_0$ and the control deceleration a.

Next in step S70, the control starting distance calculating section 96 uses the equations (1) to (5) to calculate the automatic braking control starting distance xb from the vehicle body speed $v_0$, the control deceleration a, and the braking time t'. The control starting distance calculating section 96 also calculates the alarm control starting distance xc for starting the alarm on the basis of the automatic braking control starting distance xb.

Next in step S80, the control command section 97 issues the emission command to the alarm device 61 when the distance x calculated by the distance calculating section 82 reaches the alarm control starting distance xc calculated by the control starting distance calculating section 96, issues the open command to the shut-off valve 45 when the distance x reaches the automatic braking control starting distance xb, and issues the open command to the EPC valve 46 so that the opening degree matches the control deceleration a.

As a result, the alarm device 61 is activated and the alarm is started when the distance x reaches the alarm control starting distance xc, and subsequently the automatic braking is activated with the control deceleration a when the distance x reaches the automatic braking control starting distance xb and the wheel loader 100 stops at the distance xt from the object M.

(Characteristics)

(1)

The wheel loader 100 (example of a work machine) of the present embodiment comprises the vehicle body 1, the rearward detecting section 71 (example of an object detecting section), the state detecting section 72, and the control system 26 (example of a control section). The vehicle body 1 includes the traveling unit 2 and the work implement 3 disposed on the traveling unit 2. The rearward detecting section 71 detects the object M in the periphery of the vehicle body 1. The state detecting section 72 detects at least one state of the inclination of the vehicle body 1, the articulation of the vehicle body 1, and the work implement 3. The control system 26 sets the control deceleration a (example of a deceleration) using automatic braking when the object M is detected, based on a relationship, with which the vehicle body 1 is stoppable, between the stable range R in the lateral direction and the center of gravity position gp. The relationship is obtained from detection information of the state detecting section 72.

As a result, avoidance control (the automatic braking or the alarm by the alarm device 61) when the object M is detected can be executed by using a deceleration in accordance with the stability of the vehicle body 1 in the lateral direction.

In addition, the inclined state when the stability of the vehicle body 1 is low in the lateral direction can be detected. Moreover, the articulated state when the stability of the vehicle body 1 is low in the lateral direction can be detected. The state of the work implement 3 when the stability of the vehicle body 1 is low in the lateral direction can also be detected.

(2)

The wheel loader 100 (example of a work machine) of the present embodiment further comprises the speed sensor 73 (example of a speed detecting section). The speed sensor 73 detects the speed of the vehicle body 1. The control system 26 sets the automatic braking control starting distance xb (example of a starting distance) from the object M for starting the avoidance control for avoiding a collision with the object M on the basis of the control deceleration a and the speed $v_0$ of the vehicle body 1, and executes the avoidance control on the basis of the automatic braking control starting distance xb from the vehicle body 1 to the object M and a relative distance x.

As a result, when the automatic braking is performed as the avoidance control, the deceleration can be performed that considers the stability in the lateral direction because the automatic braking is performed with the control braking force that considers the stability of the vehicle body 1 in the lateral direction.

In addition, because the automatic braking control starting distance xb is set by using the control deceleration in accordance with the stability of the vehicle body 1 in the lateral direction, the avoidance control can be performed on the basis of the braking distance corresponding to the control braking force. As a result, the suppression of a collision with the object M is possible while in a stable travel state.

(3)

In the wheel loader 100 according to the present embodiment, the control system 26 (example of a control section) compares the setting deceleration (example of a first deceleration) previously set for using the automatic braking and the rollover suppression deceleration (example of a second deceleration) set on the basis of the center of gravity position gp with respect to the stable range R, and sets the smaller thereof as the control deceleration (example of a deceleration).

As a result, when there is a possibility of a rollover when the automatic braking is activated at the previously set setting deceleration, the setting deceleration is not used and the automatic braking is performed at the rollover suppression deceleration that considers the state of the vehicle body 1 whereby a collision with the object M can be suppressed while in a stable travel state.

In addition, because the automatic braking control starting distance xb is set using the rollover suppression deceleration set on the basis of the state of the vehicle body 1, the avoidance control can be performed on the basis of a braking distance that is extended due to the rollover suppression deceleration.

(4)

In the wheel loader 100 according to the present embodiment, the control system 26 sets the rollover suppression deceleration in accordance with a comparison of the gravity vector g from the center of gravity position gp of the vehicle body 1 and the stable range R.

As a result, the rollover suppression deceleration can be set to enable decelerating with stable traveling without a rollover.

(5)

In the wheel loader 100 according to the present embodiment, the avoidance control includes the control for activating the automatic braking with the control braking force.

As a result, the automatic braking can be activated at a deceleration based on the control braking force so that rollover is suppressed in accordance with the state of the vehicle body 1.

(6)

The wheel loader 100 according to the present embodiment further comprises the alarm device 61 (example of a warning section). The alarm device 61 issues a warning that the object M has been detected. The avoidance control includes the control for issuing the warning by the alarm device 61.

As a result, the operator can be warned about the detection of the object M and the operator is able to perform an operation for avoiding a collision with the object M.

(7)

In the wheel loader 100 according to the present embodiment, the control system 26 sets, as the automatic braking control starting distance xb, the distance that the vehicle body 1 can stop before the predetermined distance xt from the object M by using the speed of the traveling unit 2 and the deceleration a.

As a result, a collision with the object M can be suppressed by performing the avoidance control on the basis of the automatic braking control starting distance xb.

(8)

In the wheel loader 100 according to the present embodiment, the avoidance control includes the control for activating the automatic braking with the control braking force. The control system 26 activates the automatic braking with the control braking force when the relative distance x reaches the automatic braking control starting distance xb.

As a result, the vehicle body 1 can be stopped before the object M by means of activating the automatic braking with the control braking force when the relative distance x to the object M reaches the automatic braking control starting distance Xb.

(9)

The wheel loader 100 according to the present embodiment further comprises the alarm device 61 (example of a warning section). The alarm device 61 issues a warning that the object M has been detected. The avoidance control also includes the control for issuing the warning by the alarm device 61. The control system 26 issues the warning with the alarm device 61 when the relative distance x reaches the alarm control starting distance xc. The alarm control starting distance xc for issuing the warning with the alarm device 61 is set at a distance further from the object M than the automatic braking control starting distance xb for activating the automatic braking.

As a result, the operator is preliminarily informed by the alarm device 61 that the automatic braking control starting distance xb for starting the automatic braking has been reached.

(10)

In the wheel loader 100 according to the present embodiment, the state of the work implement 3 includes at least one of the attitude of the work implement 3 and the loading state of the work implement 3.

Consequently, it is possible to detect an unstable state such that rollover prevention would be necessary when braking of the vehicle body 1 is performed with the setting braking force due to the attitude and loading of the work implement 3.

(11)

In the wheel loader 100 according to the present embodiment, the vehicle body 1 has the vehicle body frame 10, the front axle 34a, the rear axle 34b, the pair of front tires 4, and the pair of rear tires 7. The vehicle body frame 10 has the front frame 11 to which the work implement 3 is attached, and the rear frame 12 that has the counterweight 8 disposed thereon and that is coupled to the rear side of the front frame 11. The front axle 34a is connected to the front frame 11. The rear axle 34b is connected to the rear frame 12 in a manner that allows rotation in the roll direction perpendicular to the front-back direction. The pair of front tires 4 are attached to either end of the front axle 34a. The pair of rear tires 7 are attached to either end of the rear axle 34b. The state detecting section 72 detects the inclination angle of the vehicle body frame 10 as the inclination state of the vehicle body 1.

As a result, the control deceleration during automatic braking can be set in accordance with the stability in the lateral direction based on the inclination angle of the vehicle body 1 of the wheel loader 100 having an oscillating mechanism.

(12)

In the wheel loader 100 according to the present embodiment, the stable range R is set to a range that links the rotation center 34p of the rear axle 34b and both ends of the front axle 34a.

As a result, a stable range can be set that considers the oscillating mechanism.

(13)

The wheel loader 100 (example of a work machine) according to the present embodiment further comprises the brake circuit 42 (example of a service brake), and the EPC valve 46 (example of a brake valve) that can regulate the supply amount of hydraulic fluid to the brake circuit 42. The control system 26 controls by means of the automatic braking by driving the EPC valve 46 and using the brake circuit 42.

Consequently, when the object M is detected, the vehicle body 1 can be stopped automatically.

(14)

The control method of the wheel loader 100 (example of a work machine) according to the present embodiment comprises the step S10 (example of an object information acquiring step), the step S20 (example of a state detecting step) and the step S50 (example of a setting step). The step S10 involves acquiring information of the object M in the periphery of the vehicle body 1 that has the traveling unit 2 and a work implement 3 disposed on the traveling unit 2. The step S20 involves detecting at least one state of the inclination of the vehicle body 1, the articulation of the vehicle body 1, and the work implement 3. Step S50 involves setting the control deceleration a (example of a deceleration) using automatic braking when the object M is detected, based on a relationship, with which the vehicle body is stoppable, between the stable range R in the lateral direction and the center of gravity position gp. The relationship is obtained from detection information in step S20.

As a result, avoidance control (the automatic braking or the alarm by the alarm device 61) when the object M is detected can be executed by using a deceleration corresponding to the stability in the lateral direction of the vehicle body 1.

OTHER EMBODIMENTS

Although an embodiment of the present invention has been described so far, the present invention is not limited to the above embodiment and various modifications may be made within the scope of the invention.

(A)

While the automatic braking can only be executed during reverse travel due to the flow path being in a closed state by means of the shut-off valve 45 when the vehicle body 1 is traveling in a direction other than during reverse travel, the automatic braking may also be executed during forward travel and is not limited to being executed during reverse travel.

(B)

While the warning is issued by means of the alarm device 61 at the alarm control starting distance xc in front of the automatic braking control starting distance xb in the wheel loader of the above embodiment, the warning by means of the alarm device 61 may be issued at the same position as the automatic braking control starting distance xb. In other words, the alarm control starting distance may be set on the basis of the calculated automatic braking control starting distance xb.

(C)

While the control of the automatic braking and the emission by the alarm device 61 are both executed as the avoidance control in the wheel loader 100 of the above embodiment, only one thereof may be executed.

When only the emission by the alarm device 61 is executed as the avoidance control, the alarm control starting distance xc is set on the basis of the automatic braking control starting distance xb and the warning by the alarm device 61 is issued when the relative distance x reaches the distance xc, the automatic braking is not started even when the relative distance reaches the distance xb.

In this case, because the operator is informed about performing the avoidance control, the operator is able to, for example, perform an action such as stepping on the brake pedal 54 so that a suitable braking force is produced while watching the state of the vehicle.

(D)

While the control system 26 sets the shut-off valve 45 to the open state as the same time as the EPC valve 46 in the above embodiment, when it has been detected that the vehicle body 1 is in the reverse travel state, the shut-off valve 45 may be set to the open state regardless of the detection of the object M. In this case, the control system 26 may only perform the control of setting the EPC valve 46 to the open state when activating the automatic braking.

(E)

While the rollover suppression braking force in the automatic braking is produced by using the brake circuit of the service brake in the above embodiment, internal inertia when the accelerator 51 is turned off or travel resistance by means of the skew plates of the pump 32*a* and the motor 32*b* when the FNR lever 52 is disposed in the neutral position, may be used.

(F)

Figure 12:
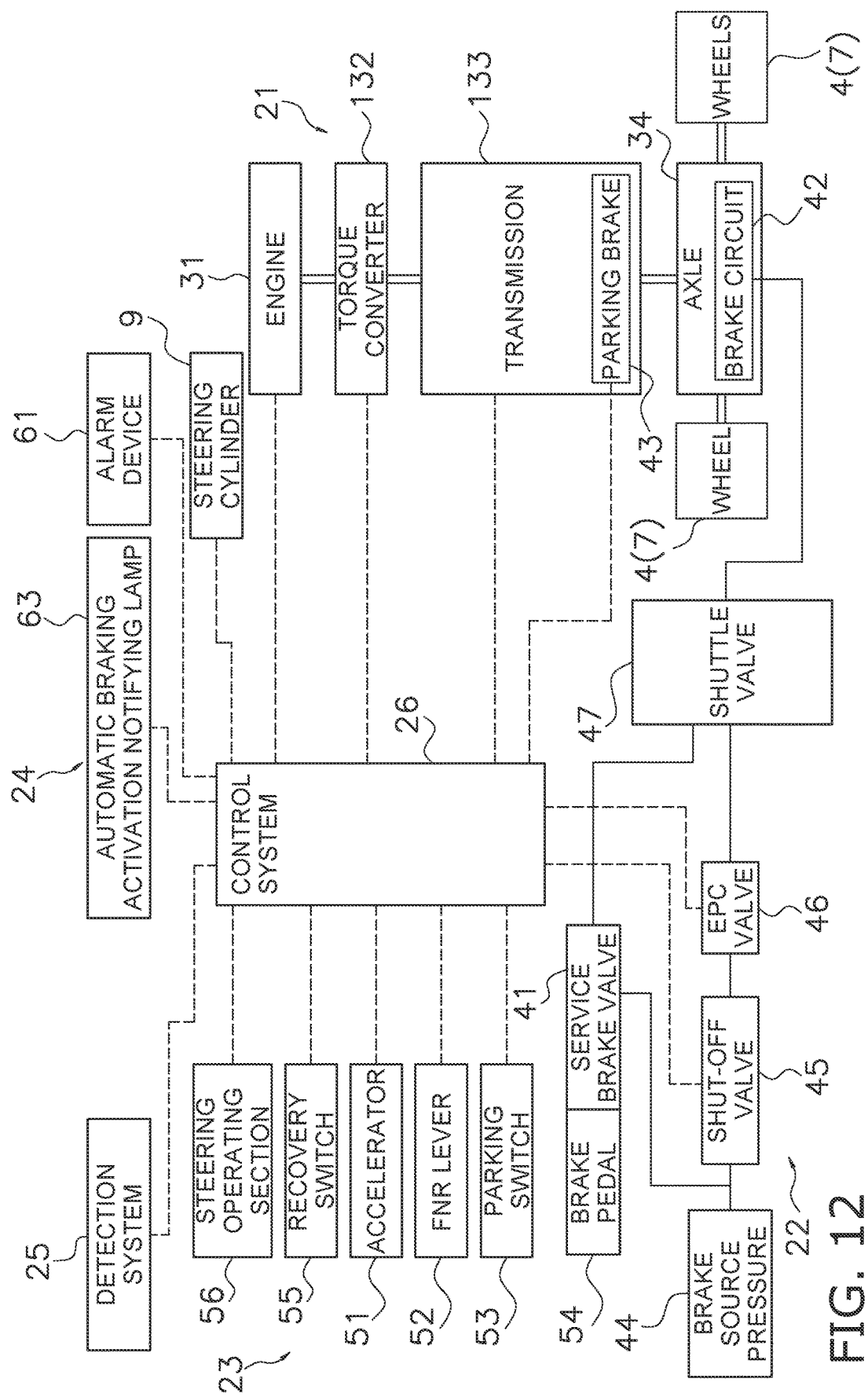
FIG. 12 is a block diagram illustrating the configuration of the wheel loader according to a modified example of the embodiment of the present disclosure.

While the HST 32 is used in the driving system 21 in the above embodiments, the present invention is not limited to a HST and a torque converter may be used. FIG. 12 is a block diagram illustrating a configuration in which a torque converter 132 and a transmission 133 are provided in the driving system 21. The driving power from the engine 31 is transmitted to the transmission 133 through the torque converter 132. The transmission 133 changes the rotational driving power of the engine 31 transmitted through the torque converter 132 and transmits the rotational driving power to the axles 34. The parking brake 43 is provided to the transmission 133.

Even when the torque converter is used, the rollover suppression braking force may be produced by regulating the opening degree of the EPC valve 46. In addition, rollover suppression braking force may be produced by turning the accelerator 51 to the off state.

Furthermore, the present invention is not limited to a HST and a hydro mechanical transmission (HMT) may also be used.

The control of the braking force can be appropriately applied to the service brake that uses the service brake valve 41, the parking brake 43, or another means for changing the braking force.

In addition, any combination of the brakes such as the service brake and the parking brake 43, and the internal inertia on the motor and engine side may be used.

(G)

The wheel loader of the above embodiments may be operated while an operator has boarded the wheel loader, the wheel loader may also be operated in an unmanned manner.

(H)

While the use of a wheel loader as an example of the work machine has been explained in the above embodiment, the work machine is not limited to a wheel loader and may also be a hydraulic excavator or the like. When the work machine is not an articulated type, the steering angle may be detected in place of the articulation angle as the vehicle body information and used in the rollover suppression deceleration setting.

(I)

Figure 13:
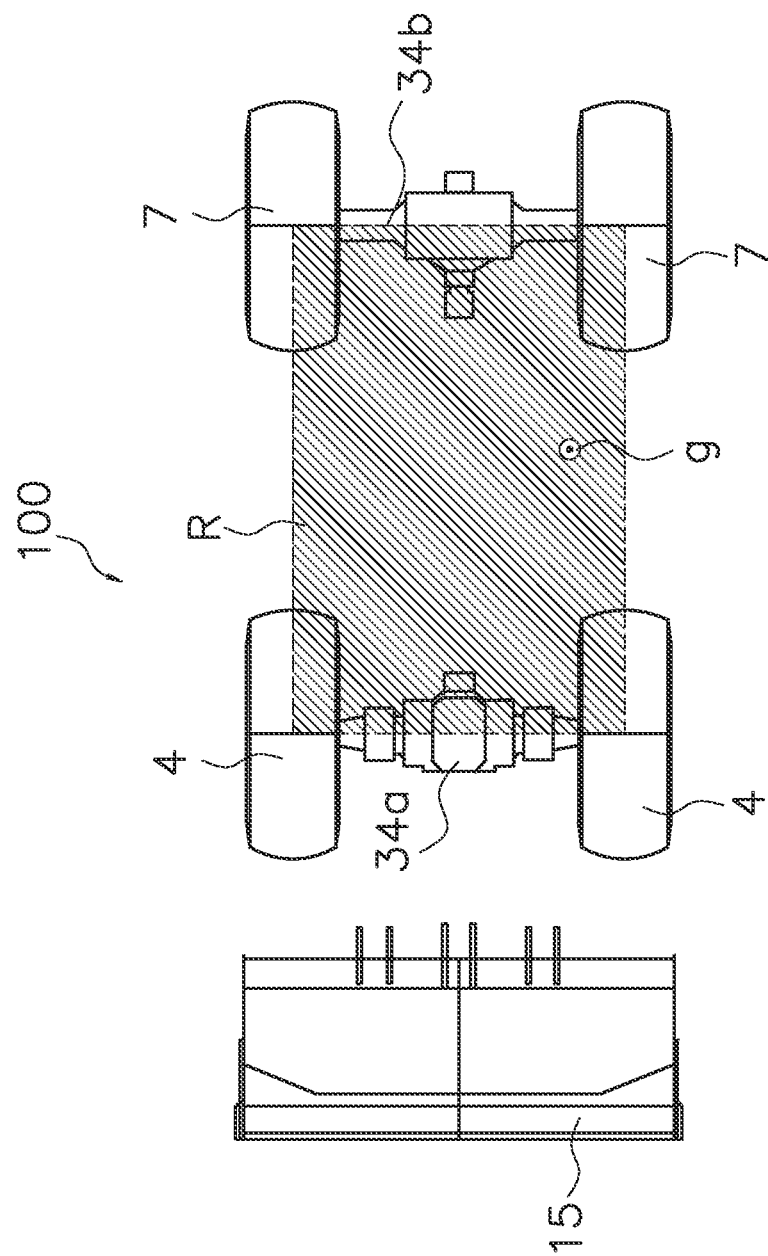
FIG. 13 illustrates another example illustrating a stable range of the wheel loader according to an embodiment of the present disclosure.

While the stable range R in the above embodiment has an approximately triangular shape as seen from the bottom, the present invention is not limited in this way. For example, the stable range R illustrated in FIG. 13 is set to a range surrounded by a first straight line that follows the center axis of the front axle 34*a*, a second straight line that follows the center axis of the rear axle 34*b*, a third straight line that joins the left end of the front axle 34*a* and the left end of the rear axle 34*b* and intersects with the first straight line and the second straight line, and a fourth straight line that joins the right end of the front axle 34*a* and the right end of the rear axle 34*b* and intersects with the first straight line and the second straight line.

In this way, the stable range R may also be formed in a rectangular shape.

According to the work machine and the control method for the work machine of the present invention, the present invention demonstrates the effect of suppressing a collision with an object while in a stable state and is useful as a wheel loader or the like.

What is claimed is:

1. A work machine comprising:
    a vehicle body including a traveling unit and a work implement disposed on the traveling unit;
    an object detecting sensor configured to detect an object in a periphery of the vehicle body;
    an alarm device configured to issue an alarm indicating that the object is detected by the object detecting sensor;
    a state detecting sensor configured to detect at least one state of an inclination of the vehicle body, an articulation of the vehicle body and the work implement; and
    a controller including a processor,
    the controller being configured such that, when the object is detected by the object detecting sensor, the controller
        executes automatic braking in a case where a gravity vector from a center of gravity position intersects a stable range in a lateral direction in which the vehicle body is stoppable, the gravity vector and the stable range being obtained from detection information of the state detecting sensor, and
        controls the alarm device to issue the alarm without executing the automatic braking in a case where the gravity vector from the center of gravity of the gravity position deviates from the stable range.

2. The work machine according to claim 1, further comprising:
    a speed detecting sensor configured to detect a speed of the vehicle body,
    the controller being configured to
        set a braking control starting distance from the object for starting the automatic braking based on a deceleration to be used in the automatic braking and the speed of the vehicle body, and
        execute the automatic braking based on a relative distance from the vehicle body to the object and the braking control starting distance.

3. The work machine according to claim 2, wherein
the controller is configured to set, as the braking control starting distance, a distance at which the vehicle body is stoppable before reaching a predetermined distance from the object, the distance being determined based on the speed of the traveling unit and the deceleration.

4. The work machine according to claim 3, wherein
the controller is configured to activate the automatic braking at the deceleration when the relative distance reaches the braking control starting distance.

5. The work machine according to claim 4, wherein
when the controller executes the automatic braking and controls the alarm device to issue the alarm, the controller executes the control of the alarm device to issue the alarm when the relative distance reaches an alarm control starting distance, and
the alarm control starting distance being set to a distance further from the object than the braking control starting distance.

6. The work machine according to claim 1, wherein
the controller is configured to
compare a first deceleration that is previously set for use in the automatic braking and a second deceleration that is set based on the center of gravity position with respect to the stable range, and
set the smaller of the first deceleration and the second deceleration as the deceleration to be used in the automatic braking.

7. The work machine according to claim 6, wherein
the controller is configured to set the second deceleration in accordance with a comparison between the gravity vector from the center of gravity position of the vehicle body and the stable range.

8. The work machine according to claim 1, wherein
the state of the work implement includes at least one of an attitude of the work implement and a loading state of the work implement.

9. The work machine according to claim 1, wherein
the vehicle body includes
a vehicle body frame including a front frame to which the work implement is attached, and a rear frame on which a counterweight is disposed, the rear frame being coupled to a rear side of the front frame,
a front axle connected to the front frame,
a rear axle connected to the rear frame in a manner that allows rotation in a roll direction perpendicular to a front-back direction,
a pair of front tires attached to either end of the front axle,
a pair of rear tires attached to either end of the rear axle, and
the state detecting sensor is configured to detect an inclination angle of the vehicle body frame as an inclination state of the vehicle body.

10. The work machine according to claim 9, wherein
the stable range is set to a range that joins a rotation center of the rear axle and both ends of the front axle.

11. The work machine according to claim 1, further comprising:
a service brake; and
a service brake valve configured to regulate a supply amount of hydraulic fluid to the service brake,
the controller being configured to perform braking by means of the automatic braking by driving the service brake valve and using the service brake.

12. A control method for a work machine, the control method comprising:
acquiring information indicating whether there is an object in a periphery of a vehicle body of the work machine, the vehicle body including a traveling unit and a work implement disposed on the traveling unit;
detecting at least one state of an inclination of the vehicle body, an articulation of the vehicle body, and the work implement; and
when the information indicates that the object is in the periphery of the vehicle body,
executing automatic braking in a case where a gravity vector from a center of gravity position intersects a stable range in a lateral direction in which the vehicle body is stoppable, the gravity vector and the stable range being determined based on the at least one state, and
controlling an alarm device of the work machine to issue an alarm indicating that the object is in the periphery of the vehicle body without executing the automatic braking in a case where the gravity vector from the center of gravity of the gravity position deviates from the stable range.

* * * * *